United States Patent [19]

Hull

[11] 3,970,263
[45] July 20, 1976

[54] RUGGEDIZED CLOSED FACE SPINNING REEL

[76] Inventor: R. Dell Hull, 6101 E. Apache St., Tulsa, Okla. 74101

[22] Filed: Apr. 7, 1975

[21] Appl. No.: 565,407

[52] U.S. Cl............................................ 242/84.2 A
[51] Int. Cl.².......................................... A01K 89/00
[58] Field of Search................. 242/84.2 A, 84.2 R, 242/84.2 E, 84.2 F, 84.21 A, 84.51 A, 84.5 A, 84.51 R, 84.2 C

[56] References Cited
UNITED STATES PATENTS

| | | | |
|---|---|---|---|
| 3,259,333 | 7/1966 | Hull | 242/84.2 A |
| 3,473,753 | 10/1969 | Hull | 242/84.2 A |
| 3,900,167 | 8/1975 | Hull | 242/84.2 A |

*Primary Examiner*—Edward J. McCarthy
*Attorney, Agent, or Firm*—Mandeville and Schweitzer

[57] ABSTRACT

The disclosure herein relates to heavy-duty closed face spinning reels, and it is directed more specifically to several unique structural improvements in closed face spinning reels for the purposes of ruggedizing the reels for landing large fresh water fish such as catfish and carp. The new reel is of all metal construction and includes an improved ruggedized frame body and cover arrangement which houses a non-rotatable (zero drag) line spool uniquely locked therein.

6 Claims, 8 Drawing Figures

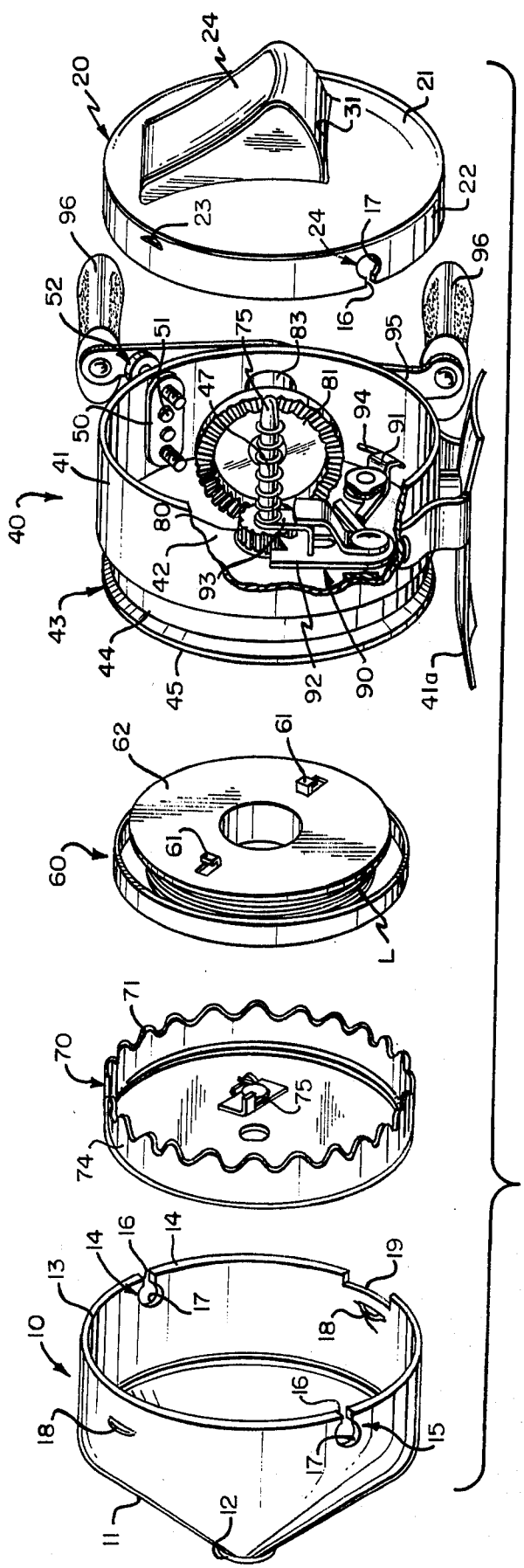
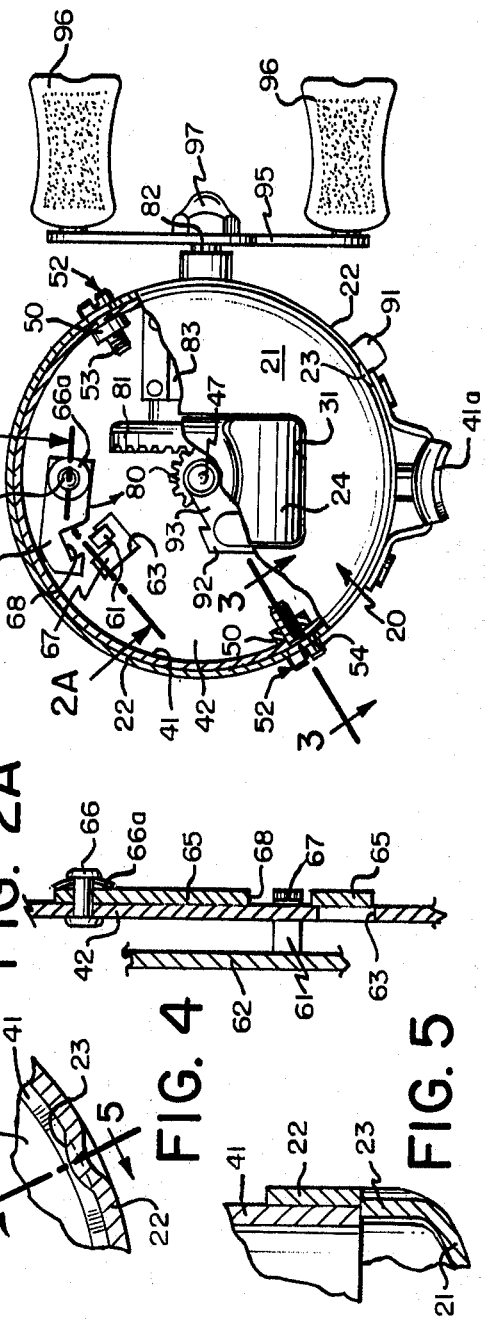
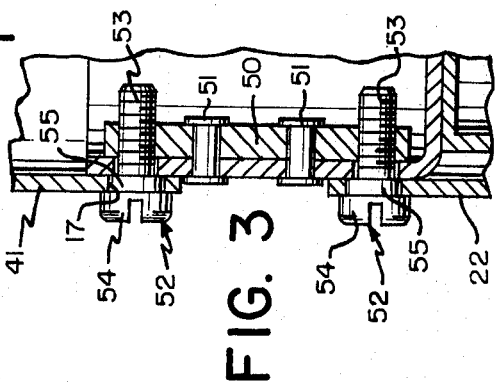

RUGGEDIZED CLOSED FACE SPINNING REEL

BACKGROUND AND SUMMARY OF THE INVENTION

Closed face fishing reels are well known to the art and have been manufactured in large quantities at comparatively low cost for many years in a variety of embodiments. Representative of the earlier reels and the well developed and rather crowded state of the art are the many U.S. patents issued to R. D. Hull, including among many others U.S. Pat. Nos. 2,541,360; 2,668,025; 2,675,193; 2,964,257; 3,020,666; 3,059,873; 3,088,691; 3,185,405; 3,259,333; 3,469,799; 3,481,554; 3,489,365; and 3,552,674.

Closed face spinning reels of the general type contemplated herein typically include a non-rotatable line spool from which fishing line is paid out and retrieved by an appropriate pickup element rotated by a crank mechanism geared thereto; a line brake to hold the line during the initial phases of casting; an anti-reverse mechanism to prevent the rotation of the crank handle in the payout direction; and a closed face housing completely enveloping the reel mechanism and including a thumb button for actuating the line brake and preparing the internal mechanism for casting.

In one type of closed face spinning reel, a line carrying spool is normally non-rotatably mounted on a hub which projects forwardly from a reel frame. The line spool is axially fixed and normally non-rotatable; however, provision is made for limited rotary slippage or "drag" of the spool relative to the reel frame for controlled withdrawal of line from the spool. During casting, the line is drawn off and over the spinnerhead of the spool by the momentum of the lure and travels through a line guide in a cover generally surrounding the spool. In the reel of the present invention, the line spool is fixed to the housing by a double-locked bayonet-type connection and is non-rotatable at all times, i.e., it is provided with a "locked drag" or "zero drag".

Retrieval of paid out fishing line may be effected in reels of this type by a cup-shaped spinnerhead mounted on a rotatable main shaft carried by the reel frame and driven by a crankshaft appropriately geared therewith. Advantageously, the spinnerhead of such a reel includes a rearwardly directed flange having notched, line engaging edges and mounting a line brake ring on its forwardly facing surfaces. Typically, the reel also includes a crank assembly to effect the necessary rotation of the main shaft to retrieve paid out line. Advantageously, a selectively actuatable anti-reverse mechanism is also included in the reel to prohibit rotation of the retrieval mechanism in a line payout direction. The line brake is actuated by a thumb button to clamp the line between the brake ring and cover housing preparatory to casting and also to displace the spinnerhead into a position in which the aforementioned notches are non-interfering with line payout.

The aforementioned basic closed face reel components have taken a variety of shapes, forms and structures in the constructions of the prior art. However, there are certain improvements therein in the nature of simplification and/or rearrangement and/or restructuring of parts which, advantageously lead to a reduction in manufacturing expense, a simplification of assembly and use of a closed face spinning reel, a ruggedization of the overall reel assembly, and an enhancement of reel reliability and response.

In accordance with the invention, the new reel further includes an improved housing assembly including a cylindrical rearwardly facing, deep drawn cup-shaped frame body, the flat transverse vertical main wall of which supports an annular, forwardly facing groove for receiving the rearwardly facing free edge of a notched spinnerhead. The groove is uniquely formed by a pair of nested concentric annular rings, one of which has integral circular flange portions riveted to the front face of the frame body main wall, and the other of which has a forward flared edge portion. The flared and non-flared forward edges of the rings are sufficiently spaced apart to define a spinnerhead receiving groove. A pair of cup-shaped covers telescope the frame body and define two "keyhole" shaped lock screw openings at opposite edges thereof, which openings receive the shanks of and are engaged and secured to the reel frame body by enlarged locking portions formed on the undersides of the heads of the lock screws.

For a more complete understanding of the reel of the present invention and a greater appreciation of its attendant advantages derived from its specific structural features, reference should be made to the following detailed description of the new all metal, ruggedized closed face reel, taken in conjunction with the accompanying drawings.

DESCRIPTION OF THE DRAWINGS

FIG. 1 is an exploded, perspective view of the components of the new and improved closed face spinning reel of the present invention showing the manner in which they are assembled;

FIG. 2 is a rear elevational view of the reel of the invention with parts broken away to show details of construction;

FIG. 2A is an enlarged, fragmentary, cross-sectional view taken along line 2A—2A of FIG. 2 to show details of the line spool lock;

FIG. 3 is an enlarged, cross-sectional view taken along line 3—3 of FIG. 2 to show details of construction of the cover locking arrangement;

FIG. 4 is an enlarged, fragmentary, cross-sectional view showing the integral frictional cover lock;

FIG. 5 is a cross-sectional view taken along line 5—5 of FIG. 4;

DETAILED DESCRIPTION OF PREFERRED EMBODIMENT

Figure 6:
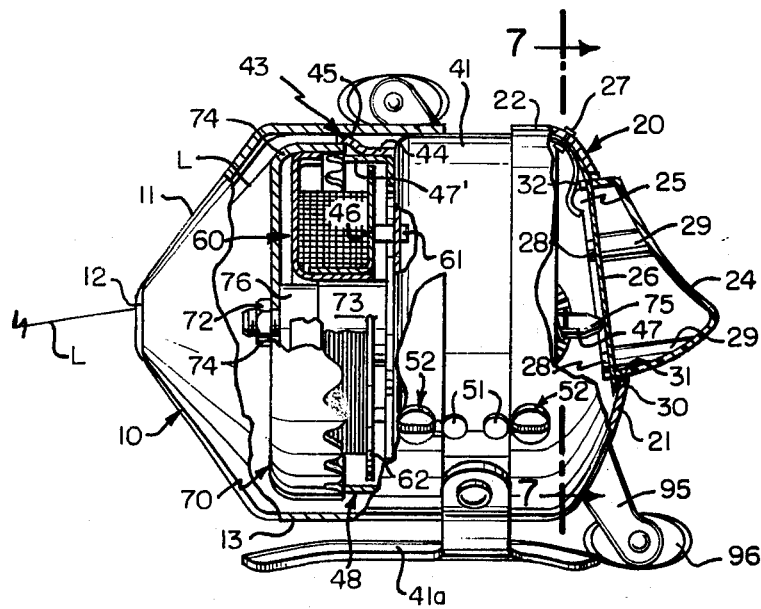
FIG. 6 is a side elevational view of the reel of the invention with parts broken away to show details of construction.

Referring now to FIG. 1, the improved heavy-duty reel of the invention includes a cup-shaped front cover 10 having forwardmost frusto-conical portions 11 terminating in a line guide opening 12 and rearwardly opening cylindrical wall portions 13. Formed at diametrically opposed edge portions of cylindrical wall 13 are special "keyhole" locking slots 14, 15 having narrow throat portions 16 leading into enlarged circular openings 17. In addition and as shown, the front cover includes integrally formed inwardly projecting dimples 18. The rear edge of the front cover 10 also includes a recess 19. The functions of the dimples 18, keyhole openings 14, 15 and recess 19 will be explained in greater detail hereinafter.

Figure 7:
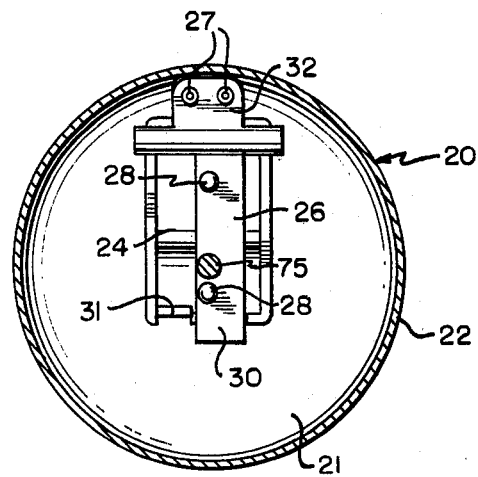
FIG. 7 is a cross-sectional view taken along line 7—7 of FIG. 6.

A rear cover 20, which has a shallow, convex rear wall portion 21 and forwardly facing cylindrical wall portions 22, closes off the rear portions of a reel frame body subassembly, generally indicated by reference numeral 40. The rear cover also includes a plurality of dimples 23 (similar to the aforementioned dimples 18) and a pair of keyhole locking slots 24 (similar to the aforementioned keyhole locking slots 14, 15). Pivotally hinged in the rear cover 20 and permanently attached thereto is a thumb button member 24, which may be made of metal or of injection molded, high impact plastic, as desired. As shown in FIGS. 6 and 7, the thumb button 24 includes a transversely extending pivot pin 25 about the axis of which the entire button pivots inwardly of the reel with respect to the rear cover portion 21. Specifically, and in accordance with one aspect of the invention, the thumb button 24 is provided with a constant bias into the position indicated in FIG. 6 by a cantilevered leaf spring member 26, which is fastened by rivets 27 to the rear cover wall 21 and which spring 26 is also fastened by rivets 28 directly to longitudinally extending button portions 29 (FIG. 6). The distal end 30 of the spring 26 extends below the lower edge of the generally rectangular thumb button opening 31 formed in the rear cover 20, so that the leaf spring 26 tends to constantly urge the thumb button 24 rearwardly and outwardly of the cover 20 to a maximum, limited and determined by the engagement of the spring portion 30 with the rear cover wall 21, as shown in FIGS. 6 and 7. The rivets 27 also secure a simple clip 32 generally shaped to conform to the contours of the inner wall portions of the rear cover and the contour of the pivot pin 25 of the thumb button. Thus, as will be appreciated, the rear cover assembly 20 includes only four parts, which may be readily assembled by first riveting the spring 26 to the thumb button 24 and then riveting the clip 32 to the rear cover wall 21 through the upper end of the spring 26 after the thumb button has been placed in its proper operative position, as indicated in FIG. 6.

The all metal reel frame subassembly, in accordance with the present invention, is comprised of a rearwardly facing cup-shaped reel body member having cylindrical walls 41 and a transverse vertical central reel frame wall 42. Attached to the front surface of the reel frame wall 42 is a special spinnerhead receiving groove member 43 comprised of an outer ring element 44 having an outwardly flared forward peripheral portion 45 force fit upon an inner cylindrical ring element 46 (FIG. 6) having a circular flange 47' through which the groove member 43 is riveted or otherwise permanently affixed to the main frame wall 42. The elements 44, 46 cooperate to define a spinnerhead receiving groove 48. The cylindrical lower wall 41 of the frame body 40 mounts a conventional tang 41a and a reel main shaft 47 with its associated line retrieval mechanism is supported by the wall 42, in a manner to be described in greater detail hereinafter.

In accordance with the invention, the cup-shaped reel body walls 41 include a pair of oblong anchor plates 50 riveted thereto by rivets 51 for receiving cover locking screws 52. The cover locking screws include narrow threaded shank portions 53, enlarged head portions 54 and annular locking shoulder portions 55 of a diameter approximately equal to the diameter of the circular locking hole openings 17 formed on the front and rear covers 10, 20, respectively. The diameter of the shanks 53 of the locking screws is slightly less than the width of the throat portions 16 of the locking slots 16 formed on the cover members. Thus, in accordance with the principles of the invention, the front and rear cover members 10, 20 may be permanently and securely affixed to the reel frame subassembly 40 by telescoping the members thereover, aligning the throat portion 16 with the locking screw shanks 53, and pressing the covers firmly onto the frame body wall portions 41. At this stage of assembly, dimples 18, 23 will hold the covers in their proper alignment by a friction fit. Thereafter, the tightening down of the screws 52 into the anchor bars 50 will permanently and ruggedly lock the covers 10, 20 to the reel frame when the locking shoulder portions 55 are disposed within the openings 17 of each of the keyhole slots. This improved cover lock arrangement assures the integrity of the entire reel assembly when using the reel to land large fish, as should be understood.

Referring again to FIG. 1, the new reel includes a line spool 60 of generally conventional configuration, with the exception of integral bayonet prongs 61 integrally formed at the rear wall 62 thereof. The bayonet prongs 61 are inserted through the L-shaped bayonet slots 63 formed in the rear wall 42 (FIG. 2) and are rotated from the wide to the narrow portion in known manner to lockingly fasten the line spool 60 to the frame body. The integrity of the fastening of the spool to the wall 42 is further insured by the provision on the rear surface of the wall 42 of a pivotal latch member 65. A notch 68 in the latch prevents the prong 61 and the spool 60 from rotating when the latch is pivoted about rivet 66, (which secures the latch to the rear wall) to engage the tail 67 of the bayonet prong 61, as shown in FIG. 2. In its engaged position, the bayonet prong 61 is in the upper portion of the bayonet slot 63.

The reel assembly of FIG. 1 also includes a cup-shaped spinnerhead 70 having a notched rear line pickup edge 71, which spinnerhead is fastened to the forward end of the shaft 47 by a lock nut 72. The line casting and retrieval mechanism of the present invention and the associated anti-reverse mechanism therefor are generally similar to that described in my earlier U.S. Pat. No. 3,489,365, the disclosure of which is incorporated by reference herein. The axially extending main shaft 47 is mounted in a forwardly projecting hub 73 riveted to the front face of wall 42 for rotation and limited axial displacement. The forward end 74 of the main shaft is threaded and mounts the spinnerhead 70 thereon, while the rearward end 75 is engageable by the inner surfaces of a thumb button spring 26. Keyed to the shaft 47 for rotation therewith is a drive gear 80 which is engaged by a gear 81. The gear 81 is mounted on a crankshaft 82, which is journaled for rotation in a bracket 83 fastened to the wall 42. A winding crank 95 mounting handles 96 is fixed to the free end of the crankshaft 82 by locking nut 97.

The anti-reverse mechanism 90 includes a control lever 91, a blocking pawl 92, and an actuating member 93, which elements cooperate to prohibit reverse rotation of the main shaft 47 when the anti-reverse mechanism is in its operative condition, as controlled by the position of the lever 91. The blocking pawl 92 may be deactivated by moving the lever 91 into an opposite position. The lever 91 projects through a slot 94 formed in the frame body wall 41, the ends of which slot limit the travel of the lever 91 between "on" and "off" positions of control of the anti-reverse mechanism. The operation of this type of anti-reverse mechanism is now well known and is described in more detail in my earlier U.S. Pat. No. 3,489,365.

Operation of the new and improved reel is simplified and reliable. To prepare for a cast, the fisherman depresses the thumb lever 24, moving the main shaft 47 and spinnerhead 70 forward and pinching the line L between the inside of the front cover 10 and the spinnerhead periphery 74. Release of the thumb lever during the cast will permit the spinnerhead to retreat to an intermediate position in which the line may freely unwind itself from the spool through the force of the cast to travel freely over the spinnerhead and through the line guide 12 on the front cover.

As described in detail in the aforementioned U.S. Pat. No. 3,259,333, the disclosure of which is incorporated by reference herein, the spinnerhead is held in the intermediate position by the cooperation of a spring actuated lever 75 and a cam surface 76 formed on the front surface of the hub 73. However, when the spinnerhead is thereafter rotated by the crank handle 96, the lever 75 is engaged by the cam surface 76 at the forward extremity of the hub extension, swinging the lever 75 out of locking position and permitting the main shaft and spinnerhead to be returned in a rearward direction by a biasing spring 78. In the rearward position of the spinnerhead 70, the notches 71 are disposed partially within the annular groove 48, so that the groove walls (inner and outer ring elements 44, 46) and a spinnerhead notch cooperate to completely encircle or trap the line L in its retrieval and winding back upon the line spool 60 in the manner described in greater detail in my earlier U.S. Pat. No. 3,259,333. As will be understood, this occurs within one revolution of the pickup head. Retrieval of the line is accomplished through the continued cranking of the crank handle 96, which will cause the rotation of the main shaft, driving the pickup head in a clockwise direction.

It should be understood that the specific form of the reel herein illustrated and described is intended to be representative only, as certain changes may be made therein without departing from the clear teachings of the disclosure. Accordingly, reference should be made to the following appended claims in determining the full scope of the invention.

I claim:

1. A ruggedized closed face spinning reel including a reel frame, a line spool supported on said frame, a main shaft extending axially through the center of said frame and mounted for limited axial movement therein between predetermined line casting and line retrieval positions, a crank drive mechanism mounted in said reel frame for rotating said main shaft, a rearwardly facing spinnerhead of predetermined diameter having a rearwardly facing notched peripheral edge and carried by the forward end of said main shaft, front and rear cover means closing off the front and rear faces of said reel frame, characterized in that
    a. said reel frame is of all metal construction and includes a cylindrical body member having a transverse circular wall;
    b. an inner annular ring having a diameter less than said predetermined spinnerhead diameter and including a radially inwardly extending circular flange connected to the front face of said circular wall;
    c. an outer annular ring having rearwardly disposed portions of a diameter not substantially greater than the diameter of said inner annular ring is secured to said inner annular ring by a force fit connection;
    d. the forwardmost peripheral portions of said outer ring are outwardly flared to a diameter greater than that of said spinnerhead;
    e. said flared peripheral portions and said inner ring thereby cooperating to define an annular groove adapted to receive said notched spinnerhead when said main shaft is in said line retrieval position.

2. The reel of claim 1, further characterized in that
    a. said circular body wall includes first integral fastening means;
    b. said line spool includes second integral fastening means;
    c. said first and second fastening means cooperating to mount, in fixed relation, said spool to said reel frame.

3. The reel of claim 2, further characterized in that
    a. said first fastening means comprises L-shaped bayonet slots;
    b. said second fastening means comprises bayonet shaped prongs;
    c. the free ends of said prongs projecting through the frame wall from the front face to the rear face thereof.

4. The reel of claim 3, in which said reel further includes
    a. a safety locking lever disposed on said rear face of said frame wall;
    b. means mounting said lever for limited pivotal movement with respect to said bayonet slot means;
    c. said lever defining a latching notch adapted to engage a projecting free end of one of said prongs to retain said prong in locked relation with said slot.

5. A closed face spinning reel comprising
    a. an all metal cylindrical reel frame supporting a line spool, rotatable spinnerhead, and associated reel control mechanism thereon;
    b. said reel frame mounting axially extending anchor bars on diametrically opposed inner surfaces thereof;
    c. first and second pairs of locking screws having shank portions extending through said reel frame, each screw being threadedly engaged with said anchor bar means and each screw having an enlarged head portion defining a smaller cylindrical shoulder portion at the underside thereof;
    d. cup-shaped front and rear covers having annular flanges of predetermined diameter slightly greater than the diameter of said reel frame;
    e. each of said covers including a pair of keyhole shaped openings including narrow throat portions of width slightly greater than the diameter of said shanks of said locking screws, said throat portions extending from the free edges thereof into circular portions having a diameter slightly greater than that of said cylindrical shoulder portions of said locking screws;
    f. whereby said covers may be telescopically assembled with said reel frame upon aligning said throat portions with said shank portions and thereafter ruggedly locked thereto upon the tightening of said shoulder portions in said circular portions.

6. The reel in accordance with claim 5, further characterized in that
    a. said cover means includes integral dimples formed on the inner surfaces thereof;
    b. said dimples cooperating with outer cylindrical surfaces of said reel frame to hold said covers firmly thereon by a friction fit independently of the effects of said locking screws.

* * * * *